United States Patent [19]

Takaku et al.

[11] Patent Number: 5,152,941
[45] Date of Patent: Oct. 6, 1992

[54] HIGH-DENSITY VITREOUS CARBON MATERIAL AND PROCESS FOR PRODUCING THE SAME

[75] Inventors: Akira Takaku; Toshimasa Hashimoto, both of Tokyo; Toshio Suzuki; Yutaka Takahashi, both of Saitama; Kazuo Saito, Tokyo, all of Japan

[73] Assignee: Nisshinbo Industries, Inc., Tokyo, Japan

[21] Appl. No.: 658,721

[22] Filed: Feb. 20, 1991

[30] Foreign Application Priority Data

Feb. 21, 1990 [JP] Japan .................................. 2-40588

[51] Int. Cl.⁵ .............................................. C01B 31/00
[52] U.S. Cl. .................................. 264/29.6; 264/297; 264/29.1; 423/445; 423/447.2; 423/449.6
[58] Field of Search ...................... 423/445, 449, 447.1, 423/447.2; 264/29.1, 29.5, 29.6, 29.7

[56] References Cited

U.S. PATENT DOCUMENTS 4,221,773  9/1980  Tsukagoshi et al. ................ 423/449
4,225,569  9/1980  Matsui et al. ....................... 423/445
4,350,672  9/1982  Layden, Jr. et al. ............... 423/445
4,698,189 10/1987  Tetzlaff .

FOREIGN PATENT DOCUMENTS 684444   4/1964  Canada ............................... 264/29.1
372389   6/1990  European Pat. Off. .
409144   1/1991  European Pat. Off. .
161010   7/1988  Japan .
161027   7/1988  Japan .
1291759 10/1972  United Kingdom ............... 264/29.6

Primary Examiner—Gary P. Straub
Assistant Examiner—Stephen G. Kalichak
Attorney, Agent, or Firm—Armstrong & Kubovcik

[57] ABSTRACT

The present invention relates to a high-density vitreous carbon material having heat resistance, chemical resistance and no liquid and gas permeability, used in various industries, as well as to a process for producing said carbon material. More particularly, the present invention relates to a high-density vitreous carbon material having a sufficient thickness and a high density, as well as to a process for producing the same.

5 Claims, No Drawings

HIGH-DENSITY VITREOUS CARBON MATERIAL AND PROCESS FOR PRODUCING THE SAME

BACKGROUND OF THE INVENTION (1) Field of the Invention

The present invention relates to a high-density vitreous carbon material having heat resistance, chemical resistance and no liquid and gas permeability, used in various industries, as well as to a process for producing said carbon material. More particularly, the present invention relates to a high-density vitreous carbon material having a sufficient thickness and a high density, as well as to a process for producing the same.

(2) Description of the Prior Art

Vitreous (amorphous) carbon materials refer to carbon of no permeability obtained by carbonizing a thermosetting resin in an inert gas.

It has hitherto been thought that no vitreous carbon is obtained in a large thickness and a high density. The reason for such thinking has been that the phenolic or furan resin conventionally used as a starting material for vitreous carbon, when carbonized, produces small bubbles caused by the gas generated, allowing the resulting vitreous carbon to have a low density and, when the bubbles are produced in a very large amount, there occur breakage and deformation of resin.

SUMMARY OF THE INVENTION

The present invention has been made in order to eliminate the drawbacks of the prior art and provide a vitreous carbon material of large thickness and high density and a process for producing the carbon material.

That is, in order to solve the problems of the prior art, the present inventors made study with particular attention paid to polycarbodiimide resin which can give a carbonization product of high carbon content at a high yield and, as a result, found that there can be produced a high-density vitreous carbon material having a sufficient thickness of about 1 mm or more and a high density of 1.5 g/cm$^3$ or more. The above finding has led to the completion of the present invention. (Incidentally, it is known that conventional high-density vitreous carbon materials have a density of 1.5 g/cm$^3$ or less.).

According to the present invention, there is provided a process for producing a high-density vitreous carbon material, which comprises subjecting a polycarbodiimide resin to a heat treatment under pressure and then carbonizing the resulting resin in a non-oxidizing atmosphere.

The present invention also provides a high-density vitreous carbon material which is produced by subjecting a polycarbodiimide resin to a heat treatment under pressure and then carbonizing the resulting resin in a non-oxidizing atmosphere.

DETAILED DESCRIPTION OF THE INVENTION

The present invention is hereinafter described in detail.

The polycarbodiimide resin used in the present invention can be a known polycarbodiimide resin or a polycarbodiimide resin which cab be produced in the same manner as for known polycarbodiimide resin [reference is made to U.S. Pat. No. 2,941,966; Japanese Patent Publication No. 33297/1972; J. Org. Chem., 28, 2069-2075 (1963); Chemical Review, 1981, Vol. 81, No. 4, 619-621; etc.]. It can be easily produced by subjecting an organic diisocyanate to a condensation reaction wherein the elimination of carbon dioxide takes place.

The organic diisocyanate used in the production of a polycarbodiimide resin can be any of aliphatic type, alicyclic type, aromatic type, aromatic-aliphatic type, etc. They can be used alone or in combination of two or more (the latter case gives a copolymer).

The polycarbodiimide resin used in the process of the present invention includes a homopolymer or a copolymer both having at least one repeating unit represented by the formula $$-R-N=C=N- \tag{I}$$

wherein R represents an organic diisocyanate residue.

As the R (organic diisocyanate residue) in the formula (I), there are particularly preferred an aromatic diisocyanate residue [In the present specification, the "organic diisocyanate residue" refers to a portion remaining after subtracting two isocyanate (NCO) groups from an organic disocyanate molecule.]

The polycarbodiimidization catalyst has no particular restriction and can be illustrated by conventionally used phosphorene oxides such as 1-phenyl-2-phosphorene-1-oxide, 3-methyl-2-phosphorene-1-oxide, 1-ethyl-3-methyl-2-phosphorene-1-oxide, 1-ethyl-2-phosphorene-1-oxide and 3-phosphorene isomers thereof or the like.

Specific examples of the polycarbodiimide resin include the followings.

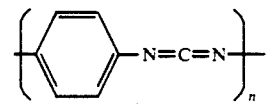

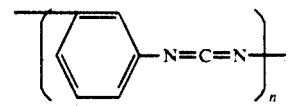

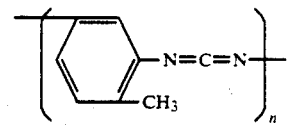

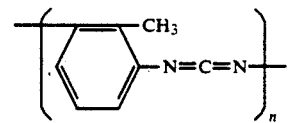

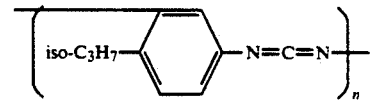

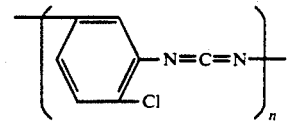

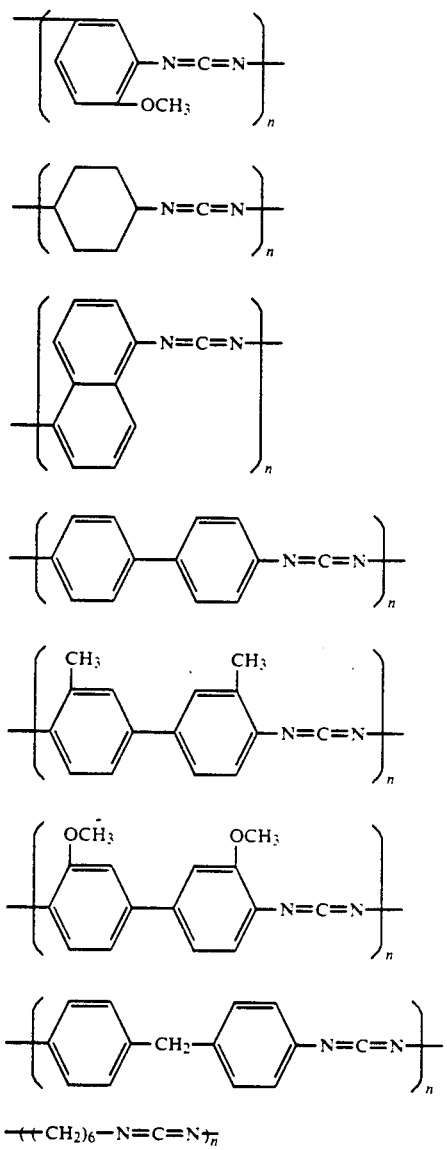

In the above formulas, n is a degree of polymerization and is in the range of 10–10,000, preferably in the range of 50–5,000.

Incidentally, the terminal(s) of the polycarbodiimide resin may be blocked with a monoisocyanate or the like, and the polycarbodiimide resin described above can be obtained in a solution form, or as a powder precipitated from the solution..

The polycarbodiimide resin is then subjected to a heat treatment under pressure and molded. The pressure used in this treatment is 50–3,000 kg/cm$^2$, preferably 80–2,700 kg/cm$^2$; the heating temperature is 150°–400° C., preferably 200°–350° C.; and the treatment time is 1 minute to 2 hours.

It is possible that prior to the above heat treatment under pressure, the polycarbodiimide resin be subjected to preliminary pressurization to remove dissolved gas, etc. to obtain better moldability. However, this preliminary pressurization is not essential in the present invention.

The molded material is then carbonized. Carbonization is effected by elevating the temperature of the molded material from around room temperature to 800°–3,000° C. in vacuum or in a non-oxidizing atmosphere of inert gas. Preferably, the temperature elevation is effected slowly in order to prevent the swelling due to gas generation. It is effected preferably at a rate of 1° C./min or less up to 800° C. and 30° C./min or less from 800° C. to 3,000° C.

The resulting carbon material was free from cracks and swelling and had good appearance, a sufficient thickness and a high density.

The present invention is hereinafter described in more detail by way of Examples.

EXAMPLE 1

50 g of paraphenylene diisocyanate was reacted in the presence of 0.13 g of a carbodiimidization catalyst (1-phenyl-3-methylphosphorene oxide) in 880 ml of tetrahydrofuran at 68° C. for 5 hours. The reaction mixture was cooled to room temperature, whereby a polycarbodiimide was precipitated. The precipitate was collected by filtration and dried at 100° C. for 2 hours to obtain a polycarbodiimide powder.

The powder was subjected to a heat treatment under pressure at a press temperature of 250° C. at a press pressure of 150 kg/cm$^2$ for 1 hour to obtain polycarbodiimide resin plates of 4 mm, 6 mm and 8 mm in thickness. These plates were carbonized in nitrogen by elevating their temperatures to 800° C. at a rate of 0.8° C./min and then to 1,600° C. at a rate of 2° C./min. The resulting carbon materials had the following thicknesses:

carbon material 1-1; 3.5 mm
carbon material 1-2; 5.0 mm
carbon material 1-3; 6.5 mm.

and were free from cracks and swelling and had good appearance.

The properties of the carbon materials are shown in Table given later.

EXAMPLE 2

50 g of methylenediphenyl diisocyanate was reacted in the presence of 0.13 g of a carbodiimidization catalyst (1-phenyl-3-methylphosphorene oxide) in 820 ml of tetrachloroethylene at 120° C. for 6 hours. The reaction mixture was subjected to the same procedure as in Example 1 to obtain a polycarbodiimide powder.

The powder was subjected to a preliminary heat treatment under pressure at a press temperature of 200° C. at a press pressure of 150 kg/cm$^2$ for 30 minutes, and then to a heat treatment under pressure at a press temperature of 300° C. at a press pressure of 150 kg/cm$^2$ for 10 minutes to obtain polycarbodiimide resin plates of 2 mm, 4 mm and 6 mm in thickness. These plates were carbonized in nitrogen by elevating their temperatures to 800° C. at a rate of 0.5° C./min and then to 2,000° C. at a rate 5° C./min. The resulting carbon materials had the following thicknesses:

carbon material 2-1; 1.7 mm
carbon material 2-2; 3.5 mm
carbon material 2-3; 6.4 mm and were free from cracks and swelling and had good appearance.

The properties of the carbon materials are shown in Table given later.

EXAMPLE 3

The polycarbodiimide powder obtained in Example 1 was subjected to a preliminary heat treatment under pressure at a press temperature of 250° C. at a press pressure of 150 kg/cm² for 30 minutes, and then to a heat treatment under pressure at a press temperature of 350° C. at a press pressure of 200 kg/cm² for 10 minutes to obtain a polycarbodiimide plate of 5 mm in thickness. The plate was carbonized in nitrogen by elevating the temperature to 800° C. at a rate of 0.3° C./min and then to 2,000° C. at a rate of 5° C./min. The resulting carbon material 3 had a thickness of 4.1 mm, was free from cracks and swelling and had good appearance.

The properties of the carbon material are shown in Table given later.

EXAMPLE 4

The polycarbodiimide powder obtained in Example 1 was subjected to a heat treatment under pressure at a press temperature of 250° C. at a press pressure of 2,500 kg/cm² for 1 minute to obtain a polycarbodiimide resin plate of 4 mm in thickness. The plate was carbonized in nitrogen by elevating the temperature to 800° C. at a rate of 0.5° C./min and then to 3,000° C. at a rate of 10° C./min. The resulting carbon material 4 had a thickness of 3.0 mm, was free from cracks and swelling and had good appearance.

The properties of the carbon material are shown in Table given later.

COMPARATIVE EXAMPLE 1

The polycarbodiimide powder obtained in Example 1 was subjected to a heat treatment under pressure at a press temperature of 120° C. at a press pressure of 40 kg/cm² to obtain a polycarbodiimide resin plate of 3 mm in thickness. The plate was carbonized by elevating the temperature to 800° C. at a rate of 0.8° C./min and then to 1,600° C. at a rate of 2° C./min. The resulting carbon material had cracks and was unable to handle, making the measurement of its properties impossible.

COMPARATIVE EXAMPLE 2

The polycarbodiimide powder obtained in Example 1 was subjected to a heat treatment under pressure at a press temperature of 410° C. at a press pressure of 300 kg/cm².

However, the resin powder caused pyrolysis, making it impossible to obtain a molded material.

COMPARATIVE EXAMPLE 3

A phenolic resin powder was subjected to a heat treatment under pressure at a press temperature of 160° C. at a press pressure of 80 kg/cm² to obtain a phenolic resin plate of 3 mm in thickness. The plate was carbonized by elevating the temperature to 800° C. at a rate of 0.8° C./min ant then to 1,600° C. at a rate of 2° C./min. The resulting carbon material had swelling, making the measurement of its properties impossible.

TABLE

| | Carbon material | Surface condition | Density (g/cm³) | Bending strength (kg/cm²) |
|---|---|---|---|---|
| Example 1 | 1-1 | Good | 1.65 | 1,300 |
| | 1-2 | Good | 1.63 | 1,280 |
| | 1-3 | Good | 1.60 | 1,280 |
| Example 2 | 2-1 | Good | 1.64 | 1,350 |
| | 2-2 | Good | 1.64 | 1,350 |
| | 2-3 | Good | 1.60 | 1,300 |
| Example 3 | 3 | Good | 1.68 | 1,380 |
| Example 4 | 4 | Good | 1.63 | 1,400 |
| Comparative Example 1 | | Cracks | 1.40 | 1,300 |
| Comparative Example 2 | — | — | — | Unable to measure |
| Comparative Example 3 | | Swelling and cracks | — | Unable to measure |

What is claimed is:

1. A process for producing a vitreous carbon material having a density of at least 1.5 gms/cc, which comprises subjecting a polycarbodiimide resin to a heat treatment under a pressure of about 50 to 3,000 kg/cm² and a temperature of about 200° to 350° C. for 1 minute to 2 hours and then carbonizing the resulting resin in a non-oxidizing atmosphere.

2. A process according to claim 1, wherein the polycarbodiimide resin is a homopolymer or a copolymer comprising at least one recurring unit represented by the formula

—R—N=C=N— wherein R is an organic diisocyanate residue.

3. A process according to claim 1 or 2, wherein the polycarbodiimide resin is subjected, prior to the heat treatment under pressure, to a gas removal treatment.

4. A process according to claim 1 or 2, wherein the carbonization is effected at temperatures of 800°–3,000° C.

5. A process according to claim 1 or 2, wherein the temperature elevation for effecting the carbonization is made at a rate of 1° C./min or less up to 800° C. and at a rate of 30° C./min or less from 800° C. to 3,000° C.

* * * * *